M. M. CUNNINGHAM.
SPRING COILING MACHINE.
APPLICATION FILED AUG. 5, 1918.
1,326,031.
Patented Dec. 23, 1919.
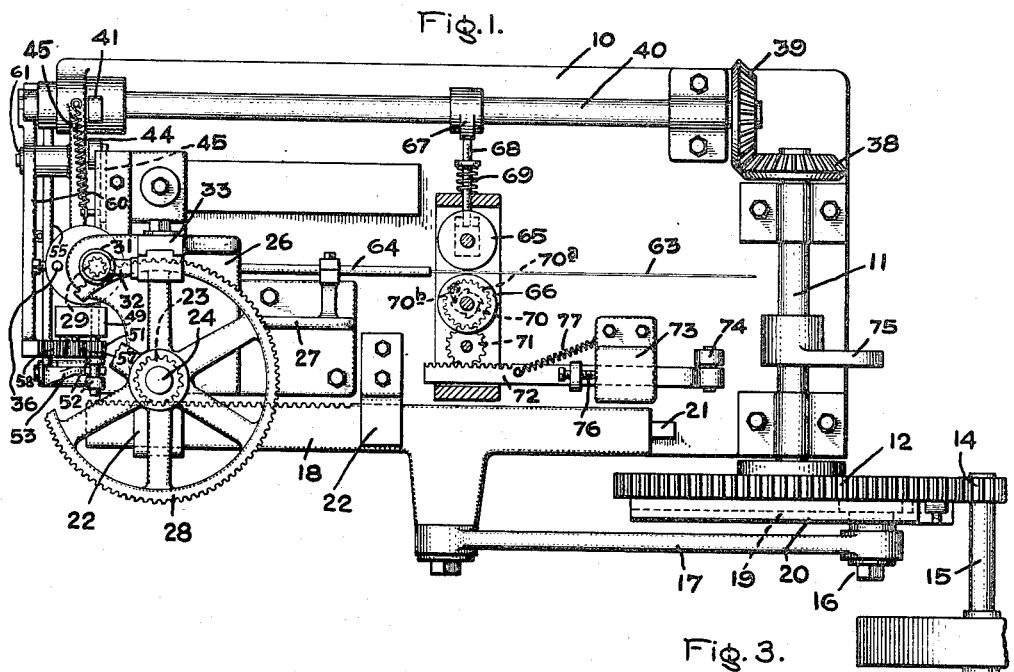
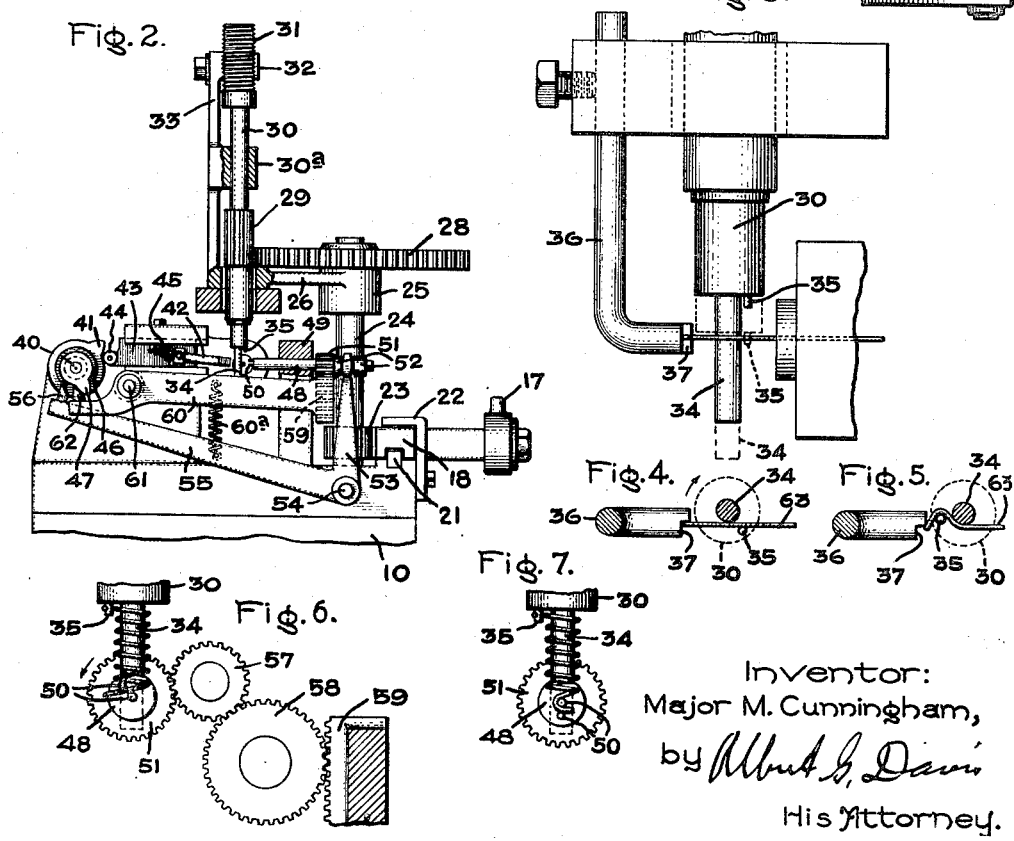
Inventor:
Major M. Cunningham,
by Albert G. Davis
His Attorney.

UNITED STATES PATENT OFFICE.

MAJOR M. CUNNINGHAM, OF SCHENECTADY, NEW YORK, ASSIGNOR TO GENERAL ELECTRIC COMPANY, A CORPORATION OF NEW YORK.

SPRING-COILING MACHINE.

1,326,031.

Specification of Letters Patent.

Patented Dec. 23, 1919.

Application filed August 5, 1918. Serial No. 248,249.

*To all whom it may concern:*

Be it known that I, MAJOR M. CUNNINGHAM, a citizen of the United States, residing at Schenectady, in the county of Schenectady, State of New York, have invented certain new and useful Improvements in Spring-Coiling Machines, of which the following is a specification.

The present invention relates to spring coiling machines such as are used to make coiled springs from straight wire and has for its object generally to provide an improved structure in a machine of this character.

For a consideration of what I believe to be novel and my invention attention is directed to the accompanying specification and claims appended thereto.

In the drawing, Figure 1 is a top plan view of a machine embodying my invention; Fig. 2 is an end elevation thereof partly in section; Figs. 3, 4, and 5 are diagrammatic fragmentary views illustrating the manner in which a hook is formed at one end of a spring; and Figs. 6 and 7 are fragmentary views illustrating the formation of a hook at the other end of the spring.

Referring to the drawing, 10 indicates a base or framework on which is journaled a driving shaft 11 which carries at one end a gear wheel 12. Shaft 11 may be driven in any suitable manner. In the present instance it is shown as being driven by a pinion 14 which meshes with gear wheel 12 and is carried on a shaft 15 which in turn may be belted or otherwise connected to an electric motor or other similar source of driving power. Carried by gear wheel 12 is a pivot pin 16 on which is pivoted one end of a connecting rod 17, the other end pivotally connected to a sliding rack 18 to which it imparts reciprocating motion. Pivot pin 16 is located in a groove 19 formed in a cross-bar 20 attached to gear wheel 12 and it is adapted to be adjusted and clamped at any point along the groove 19. By this means the distance of pin 16 from the center of gear wheel 12 can be varied to adjust the length of the reciprocating stroke imparted to rack 18. The length of the stroke imparted to rack 18 determines the number of turns made in the coiled spring, as will appear hereinafter. Rack 18 is guided in its movements by a key 21 and suitable brackets 22 and meshes with a pinion 23 on the lower end of a vertical shaft 24. Shaft 24 is supported by a stop bearing (not shown) at its lower end and its upper end is carried in a bearing sleeve 25 which forms a part of a flat support 26 carried by a vertical rib 27. On the upper end of shaft 24 is a gear wheel 28. The reciprocating movement of rack 18 imparts an oscillatory movement to gear wheel 28. Gear wheel 28 meshes with a wide faced pinion 29 fixed on a vertical shaft 30 carried in a guide bearing 30ª. Shaft 30 may be termed a winding shaft. On the upper end of winding shaft 30 is a screw thread 31 which meshes with a thread on the end of a stationary arm 32 carried by a bracket 33. The screw thread on the end of arm 32 amounts in substance to a stationary nut and when winding shaft 30 is turned first in one direction and then in the other, by gear wheel 28 it will at the same time have imparted to it a vertical reciprocating movement due to the thread 31 turning on the stationary thread on the end of arm 32. When winding shaft 30 moves vertically pinion 29 slides across the face of gear wheel 28, and pinion 29 is made sufficiently wide to always remain in mesh therewith. On the lower end of winding shaft 30 is a winding finger 34 of a diameter equal to the diameter of the wire coil to be made and it is around this that the wire is coiled. Adjacent the upper end of finger 34 is a short downwardly projecting pin 35 fixed to winding shaft 30. Pin 35 is instrumental in putting a hook at the upper end of the spring. At one side of winding shaft 30 is a stop arm 36 having its lower end turned at right angles to face winding shaft 30 and on such end is a shoulder 37 (see Fig. 3) which is also a part of the hook forming mechanism for the upper end of a spring. On the end of driving shaft 11 opposite to that on which gear wheel 12 is located is a bevel gear wheel 38 which meshes with a bevel gear wheel 39 on a cam shaft 40. On cam shaft 40 is a cam 41 which operates a reciprocating cutting off tool 42 carried by sliding plate 43. Plate 43 is provided with a roller 44 with which the cam directly engages and it is biased to a position against the cam by a spring 45. On cam shaft 40 are also two cams 46 and 47 which operate a fixture for putting a hook in the wire at the lower end of the spring. This fixture comprises a shaft 48 carried in a support 49 and adapted to both oscillate and slide therein. On one end shaft 48 is provided with a pair of spaced projecting pins 50 (Fig. 2) and at the other end with a pinion 51 and two spaced nuts 52 between which is located the end of one arm 53 of a bell crank. This bell crank lever is pivoted at 54 and its other arm 55 extends to a point adjacent cam shaft 40 and is provided with a projection 56 adapted to be engaged by cam 46. Cam 46 causes the bell crank lever comprising arms 53 and 55 to impart a reciprocating movement to shaft 48 each time cam 46 engages the projection 56. Meshing with pinion 51 is an idler 57 (Fig. 6) with which meshes a gear wheel 58, and meshing with gear wheel 58 is a rack 59 on one end of a lever 60. Lever 60 is pivoted at 61 and its other end is provided with a projection 62 adapted to be engaged by cam 47. When cam 47 engages projection 62, lever 60 is turned on its pivot 61 and through the gearing as shown in Fig. 6 imparts a turning movement to shaft 48. The bell crank lever comprising arms 53 and 55, and lever 60 are biased toward their respective cams 46 and 47 by a spring 60ª having one end connected to arm 55 and the other end to lever 60. 63 indicates a wire from which the coiled springs are to be formed. A suitable supply of it may be arranged on a spool adjacent the machine and fed forward as needed. The end of wire 63 is carried in a guide 64 which terminates adjacent the winding finger 34 and it is fed forward at certain times by a pair of rollers 65 and 66 between which the wire passes. Rollers 65 and 66 are normally not in contact with wire 63 but roller 65 is flexibly supported and is adapted to be pushed toward roller 66 to clamp the wire 63 between the two rollers by a cam 67 on shaft 40 which engages a pin 68. Pin 68 is biased to a position away from roller 65 and toward cam 67 by a spring 69. Associated with the shaft which carries roller 66 is a pawl and ratchet mechanism for turning the rollers 65 and 66 to feed forward the wire 63. In the present instance this mechanism is illustrated as comprising a ratchet wheel 70 fixed to the shaft which carries roller 66 and a gear wheel 70ª loose on such shaft and provided with a pawl 70ᵇ for moving ratchet wheel 70. Meshing with gear wheel 70ª is an idler 71 and meshing with idler 71 is a rack 72 carried in a guide 73 and provided at its end with a roller 74 adapted to be engaged by a cam 75 on shaft 11. On rack 72 is a stop 76 and a spring 77 holds stop 76 against guide 73.

The operation is as follows: assume that the machine is running and that the parts are in the positions shown in Fig. 1, a spring having just been completed. Wire 63 has been fed forward against stop 36, the end of it lying against shoulder 37 as shown in Figs. 3 and 4, and cam 67 on shaft 40 is in engagement with pin 68 thus holding the wire clamped between rollers 65 and 66 to maintain it firmly against stop 36. The winding finger 34 occupies the position shown in dotted lines in Fig. 3, the wire 63 being located between finger 34 and pin 35 as shown in Fig. 4. Gear wheel 12 now moves the rack 18 forward or toward the left (Fig. 1) turning pinion 23 and gear wheel 28 which latter turns the winding finger 34 in the direction of the arrow in Fig. 4. This first brings the pin 35 around to the position shown in Fig. 5 where it catches wire 63 and in sliding it off the shoulder 37 puts a hook in it as is illustrated in Fig. 5. Pin 35 also serves to firmly hold the end of the wire during the coiling operation which follows. As the winding finger 34 turns it is driven upward due to the threaded end of the winding shaft being in engagement with the threads on the end of the stationary arm 32, and the wire is coiled around the winding finger to form a spring as is shown in Figs. 6 and 7. As the wire begins to coil around the winding finger, cam 67 moves away from pin 68 thus permitting roller 65 to move away from roller 66 so that the wire 63 may move forward freely. The wire is coiled around winding finger 34 until the rack 18 reaches the end of its movement toward the left and as will be clear the extent of this movement and hence the number of turns in the coil depends on the adjustment of the pivot pin 16 with respect to the center of gear wheel 12, the longer the stroke of rack 18 the greater the number of turns. As rack 18 approaches the end of its forward movement, cam shaft 40 brings cam 41 into engagement with roller 44 and moves the cutting off tool 42 toward the wire 63 to cut it off. At the same time cam 46 turns bell crank lever 55, 53 on its pivot 54 thus moving shaft 48 toward the wire to bring the two spaced pins 50 astride the wire at the end of the coil which has just been formed. By this time the cutting off tool 42 has severed the wire and the position of the pins 50 relative to the lower end of the coil is as shown in Fig. 6. Cam 47 now turns lever 60 on its pivot 61 thus moving rack 59 which through gear wheels 58, 57 and 51 imparts a slight turning movement to shaft 48 thereby bending the end of the wire into a hook as shown in Fig. 7. As soon as the hook is formed cams 46 and 47 move away from projections 56 and 62 and spring 60ª immediately brings bell crank lever 55, 53, lever 60 and shaft 48 back to their original positions. In the meantime cam 41 has moved away from roller 44 and spring 45 has returned the cutting off tool 42 back to normal position. The completed spring with a hook at each end then drops off winding finger 34 into a suitable container. At about this same time cam 67 has again come into engagement with pin 68 thus clamping the wire 63 between rollers 65 and 66 and cam 75 on shaft 11 now strikes roller 74 giving a short forward movement to rack 72 which results in turning roller 66 and feeding wire 63 forward into engagement with stop 36 where it will be held by the rollers during the return movement of rack 18. The pawl and ratchet mechanism 70, 70ᵇ permits rack 72 to return to its normal position without turning roller 66 in a reverse direction. The return movement of rack 18 brings the winding shaft 30 and winding finger 34 down again to the dotted line position of Fig. 3 and the parts are then in position to form another spring.

In the present instance the hook at the lower end of the coil (Fig. 7) projects downwardly and faces toward the right but as will be clear it may be made to extend and to face in any direction by varying the location of shaft 48 and the direction of turning. Also the extent of the turning movement may be varied to vary the amount of twist in the hook.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. In a machine for making coiled springs from wire, the combination of a winding finger around which the wire is coiled, means for holding the free end of the wire during the coiling operation, a shaft located at a right angle to the wire and having spaced pins on its end, a gear member on the shaft, a lever having a rack which engages said gear member, a second lever connected to said shaft for moving it axially, the ends of said levers terminating adjacent each other, a counter shaft, and cam means thereon for actuating said levers to move said first named shaft axially so the pins thereon engage the wire and turn it so the pins form a hook in the end of the wire.

2. In a machine for making coiled springs from wire comprising a winding finger and means for turning it and moving it axially, a fixture for forming a hook in the wire after the spring has been coiled, comprising a shaft located at an angle to the wire and having spaced pins on its end, a gear member on the shaft, a lever having a rack at one end which engages said gear member for turning the shaft, a second lever having an end which engages said shaft to move it axially, the other ends of said levers terminating adjacent each other, and cam means automatically operated which actuate said levers to first move the shaft axially to bring the pins into engagement with the wire and then turn it so the pins form a hook in the end of the wire.

In witness whereof I have hereunto set my hand this 3d day of August, 1918.

MAJOR M. CUNNINGHAM.